United States Patent Office 3,007,888
Patented Nov. 7, 1961

3,007,888
EPOXY RESIN BASE PROTECTIVE SURFACES
George Raymond Mack and Willis G. Thomas, Jr., Allentown, Pa., assignors to The Electric Storage Battery Company, a corporation of New Jersey
No Drawing. Filed Dec. 31, 1958, Ser. No. 784,076
1 Claim. (Cl. 260—37)

The present invention relates to a protective coating or monolithic layer particularly adapted for application on concrete and other porous, unglazed masonry surfaces.

In industry, the vulnerability of masonry surfaces to attack by certain acids, alkalines, salts and organic chemical compounds creates a serious maintenance problem. In the past, it has been a general practice to protect such surfaces from attack by providing them with a protective coating adapted to resist the particular type of corrosion involved. Such a coating must not only be able to withstand corrosive attack, but it must also be able to withstand physical abuse, form a bond with the surface, and be adapted to expand and contract with the surface to which it is bonded. Where a given surface is subject to attack by only one type of corrosive agent, the selection of a suitable protective coating for that surface is not too difficult a problem. However, where a surface is subject to attack by more than one type of corrosive agent, the selection of a coating adapted to withstand the attack of both types of corrosion present a more difficult problem. At present, the most commonly used protective coatings adapted for universal application are those which employ a polyester resin base. While these coatings have been satisfactory to a certain extent, they do not bond well to concrete and are subject to shrinkage upon setting which sets up stresses within the coating and results in the ultimate cracking of the coating during use. Still further, while polyester base resins are resistant to many commonly utilized corrosive agents, they are not resistant to many others and thus, are not ideally suited to universal application.

Accordingly, it is a specific object of the present invention to provide a new and improved protective coating particularly adapted for application on concrete and other porous, unglazed masonry surfaces which will resist attack by most of the commonly used corrosive agents.

Another object of the present invention is to provide a new and improved protective coating which forms an extremely strong bond with porous unglazed masonry surfaces particularly concrete.

Still another object of the present invention is to provide a new and improved protective coating for concrete which is not subject to shrinkage upon setting and which has a co-efficient of thermal expansion similar to that of concrete.

A further object of the present invention is to provide a new and improved protective coating that can be applied directly over existing masonry surfaces to upgrade that surface and to provide thereon a durable non-skid corrosion-proof coating.

Another further object of the present invention is to provide a coating for concrete surfaces which will add very little weight or height to existing surfaces.

In accordance with the present invention, there is provided a composition based upon modified epoxy resins which may be applied to an unglazed masonry surface such as concrete in thickness of from 3/16 inch to 1/2 inch. The composition sets or polymerizes at room temperature by internal chemical action and is thereby converted to an extremely dense compound that forms a strong bond with concrete. The compound is subject to minimum shrinkage during setting which reduces the possibility of cracking or the development of internal stresses which could adversely affect the strength, impact resistance, or adhesion of the coating. It is specifically designed to withstand foot traffic, light trucking, and corrosive attack from aggressive chemicals. In addition, the coating of the present invention can be rapidly applied to either new construction or existing concrete surfaces which may be presently deteriorating.

Other objects and advantages of the present invention will be readily apparent from the following detailed description of preferred embodiments thereof.

In carrying out one form of the present invention, there is mixed together 4.45 parts by weight of a low molecular weight epoxy resin, preferably one having a viscosity of about 150 to 210 centipoises at 25° C. and an epoxide equivalent of about 170 to 180 and 5.07 parts by weight of a high molecular weight epoxy resin, preferably one having a viscosity of about 10,000 to 16,000 centipoises at 25° C. and an epoxide equivalent of about 180 to 200. To the mixed resins, there is added 2.18 parts by weight of an epoxy flexibilizer preferably a cashew nut shell liquid flexibilizer such as that available on the market under the trade name "Cardolite NC-513," manufactured by the Irvington Chemical Division of the Minnesota Mining and Manufacturing Co. and 1.24 parts by weight of an epoxy accelerator. To the mixture of epoxy resins, flexibilizer and accelerator, there is then added by blending or kneading 87.06 parts by weight of a silica sand filler. If it is desired, a suitable coloring material may be added in lieu of an equal part of a filler. For example, to produce a coating having a grey color, the addition of 0.65 part by weight of a mixture comprising titanium dioxide, antimony oxide or carbon black has been found satisfactory. The mixing of these ingredients should be done at the site of the surface to be covered and may be accomplished either by hand in a mortar box or mechanically in a mixer.

By way of illustration and example and not by way of limitation, the following commercially available materials have been found suitable for use in the formulation noted above. The low molecular weight epoxy resin may be a diglycidyl ether of bisphenol A

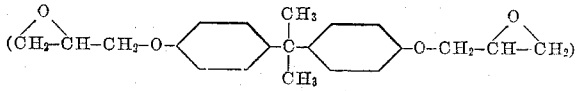

diluted with 20% by weight of butyl glycidyl ether such as that available commercially under the trade name "Epi-Rez 504," manufactured by the Jones Dabney Co. A suitable high molecular weight epoxy resin is undiluted diglycidyl ether of bisphenol A also available from the Jones Dabney Co. under the trade name "Epi-Rez 510." An example of another suitable flexibilizer is the liquid flexibilizer available on the market under the trade name of "Versamids," from General Mills Inc., which is prepared by the condensation of polymerized linoleic acid with polyamines. Still another flexibilizer is that sold under the trade name of "Thiokol LP-3," which is a difunctional mercaptan made from a 98 mole percent of bis (2-chloroethyl) formal and 2 mole percent of trichloropropene and which is manufactured by the Thiokol Corp. Some examples of suitable epoxy accelerators are: diethylenetriamine, triethylenetitramine, and tetraethylenepentamine.

To provide an extremely dense coating having a high strength and good impact, compression and abrasion resistance, it is preferable that silica sand filler be a graded silica aggregate. By way of example, a graded silica aggregate having the following screen analysis has been found satisfactory: 17% by weight 6 to 10 mesh or coarser; 31% by weight 10–20 mesh; 25% by weight 20–40 mesh; 14% by weight 40–60 mesh; 6% by weight 60–80 mesh; 3% by weight 80 to 100 mesh and 4% finer than 100 mesh.

The composition may be applied to the surface to be coated by trowelling to a thickness of 3/16 inch to ½ inch. If the surface is new concrete, it is preferable that it have a neat clean sand finish, free of ridges and depressions, such as may be obtained by wood float passes. Preferably, the surface should be swept with a broom and acid washed with a solution of equal parts of muriatic acid and water. After acid washing, the surface may then be flushed with clear water and dried thoroughly. It should be neutral or alkaline before application of the compound. If the coating is to be applied to an old concrete, the surface should be free of loose particles, any previously applied paint, and any oil spots. Again, it is preferable to use the acid wash noted above to prepare the surface for the compound. The concrete slab or flooring must be thoroughly dried before the application of the coating compound.

The best temperature range for applying the coating of the present invention to a surface is from about 70° F. to 80° F. However, the coating may be applied when the room temperature is between 55° F. to 100° F. The rate of curing or polymerization of the coating is dependent upon room temperature and thickness. At 75° F., a ¼ inch layer will be hard enough to bear foot traffic in 16 hours. However, maximum physical strength and chemical corrosion resistance will not be obtained for a period of about 7 days. The specific physical properties of the protective coating prepared according to the example noted hereinbefore are as follows:

| | |
|---|---|
| Compressive strength | 11,000 p.s.i. |
| Tensile strength | 1,400 p.s.i. |
| Hardness (Shore D-2) | 75 to 80. |
| Shrinkage | 0.18%, max. |
| Absorption, 5 hr. boil | 0.2%, max. |
| Impact resistance | >75 in. lbs. |
| Temperature resistance | 200° F. max. for continuous service, 250° F. for short duration. |
| Density | 124 lbs./cu. ft. |
| Flammability | Does not support combustion. |
| Coverage, ¼ in. thick layer | Approx. .4 sq. ft./lb. (2.6 lbs./sq. ft.). |
| Coefficient of expansion/° C. | $2.6 \times 10^{-5}$. |

The coating of the present invention is resistant to most non-oxidizing acids, alkalies, salts, oils, greases, food, food acids and many solvents. The coating is not recommended, however, with oxidizing acids, aromatics or ketones. The resistance of the coating of the present invention to attack by specific corrosive agents is listed in the table below. In this table, the resistance of the coating is given for two conditions of attack; one, where the corrosive agent is cold, that is, at 70° F., and two, where the corrosive agent is hot, 190° F. or the boiling point of the agent. For simplicity, the following key is utilized:

E—No attack  P—Attacked
G—Appreciably no attack  N—Rapidly attacked
F—Some attack but usable in some instances

| | Cold | Hot | | Cold | Hot |
|---|---|---|---|---|---|
| Acids | | | Neutral salts—Con. | | |
| Acetic, 10% | P | N | Magnesium chloride, nitrate, sulfate | E | E |
| Acetic, glacial | N | N | Potassium chloride, nitrate, sulfate | E | E |
| Benzene sulfonic, 10% | E | E | Sodium chloride, nitrate, sulfate | E | E |
| Benzoic | E | E | | | |
| Boric | E | E | Gases | | |
| Butyric, 100% | P | N | | | |
| Chloroacetic, 10% | E | E | Chlorine, dry | F | N |
| Chromic, 5% | F | N | Chlorine, wet | P | N |
| Citric, 10% | E | E | Sulfur dioxide, dry | E | G |
| Fatty acids | E | E | Sulfur dioxide, wet | E | G |
| Fluosilicic | N | N | | | |
| Formic, 90% | E | F | Organic materials | | |
| Hydrobromic, 20% | E | F | | | |
| Hydrochloric, 20% | E | F | Acetone | N | N |
| Hydrocyanic | E | E | Alcohol, methyl, ethyl | E | E |
| Hydrofluoric, 20% | N | N | Aniline | N | N |
| Hypochlorous, 5% | F | N | Benzene | N | N |
| Lactic, 5% | F | N | Carbon tetrachloride | E | F |
| Maleic, 25% | E | N | Chloroform | E | G |
| Nitric, 5% | G | N | Ethylene chloride | E | P |
| Oleic | E | E | Ethyl acetate | N | N |
| Oxalic | E | E | Formaldehyde, 37% | E | G |
| Phosphoric | E | F | Phenol, 5% | E | N |
| Picric | G | F | Refinery crudes | E | F |
| Stearic | E | F | Trichloroethylene | E | G |
| Sulfuric, 50% | G | N | Mineral oils | E | E |
| Sulfuric, 80% | F | N | | | |
| Oleum | N | N | Paper mill applications | | |
| Mixed acids, 57% H₂SO₄, 28% HNO₃ | N | N | Kraft liquor | E | G |
| Alkalies | | | Black liquor | E | G |
| Ammonium hydroxide | E | G | Green liquor | E | G |
| Calcium hydroxide | E | E | White liquor | E | G |
| Potassium hydroxide | E | F | Sulfite liquor | E | G |
| Sodium hydroxide | E | F | Chlorite bleach | F | N |
| | | | Alum | E | E |
| Acid salts | | | | | |
| Alum or Aluminum Sulfate | E | E | Textile industry | | |
| Ammonium Chloride, nitrate sulfate | E | E | General use | E | E |
| Copper chloride, nitrate, sulfate | E | E | Food industry | | |
| Ferric chloride, nitrate, sulfate | E | E | General use | E | E |
| Nickel chloride, nitrate, sulfate | E | E | Breweries | E | E |
| Stannic chloride | E | E | Dairies | E | E |
| Zinc chloride, nitrate, sulfate | E | E | Milk, fresh | E | E |
| | | | Milk, sour | E | E |
| Alkaline salts | | | Vinegar | G | F |
| Barium sulfide | E | E | Tomato juice | E | E |
| Sodium bicarbonate | E | E | Grape juice | E | E |
| Sodium carbonate | E | E | Mayonnaise | E | E |
| Sodium sulfide | E | E | Mazola salad oil | E | E |
| Trisodium phosphate | E | E | Beer | E | E |
| | | | Tide | E | E |
| Neutral salts | | | Lux liquid | E | F |
| Calcium chloride, nitrate, sulfate | E | E | Miscellaneous industries | | |
| | | | Plating | E | E |
| | | | Petroleum | E | E |
| | | | Tanning | E | E |
| | | | Oil and soap | E | E |
| | | | Water and sewer | E | E |

Though the proportions noted above for the coating composition of the present invention are preferred, they may be varied somewhat and still provide a protective coating having the desirable characteristics noted hereinbefore. In the formulation of the preferred embodiment of the present invention, it should be noted that the two epoxy resins, the flexibilizer and the epoxy accelerator are liquids and the graded aggregate a solid filler. In this formulation, the filler is present in amounts of approximately 6.7 to one of these liquids. By utilizing less coarse fillers, it is possible to utilize as low as 4 parts filler to 1 part of liquid. By way of specific example, if a graded silica aggregate is utilized having the following screen analysis, 5 parts of filler may be utilized to 1 part of the liquid components; 6.7% by weight 10 to 20 mesh; 41.12% by weight 20 to 40 mesh; 5.04% by weight 40 to 60 mesh; 7.78% by weight 60 to 80 mesh; 4.66% by weight 80 to 100 mesh; and 14.68% by weight finer than 200 mesh. Where it is desired to use 4 parts by weight of filler to 1 part by weight of the liquid components, a graded aggregate having the following analysis has been found satisfactory: 14.08% by weight 60 to 80 mesh; 6.78% by weight 80 to 100 mesh; 14.95% by weight 120 to 140 mesh; 18.02% by weight 180 to 200 mesh; and 20.41% by weight finer than 325 mesh.

It is also possible to vary the liquid components of the coating of the present invention and still achieve the desirable characteristics noted hereinbefore. The following variations have been found to produce satisfactory coating compositions: about 4.45 to 7.0 parts by weight of low molecular weight epoxy resin; about 3.75 to 5.07 parts by weight of high molecular weight epoxy resin; about 1.25 to 3.60 parts by weight of flexibilizer and about 1.24 to 1.47 parts by weight of epoxy accelerator. Again, a small amount of coloring material may be substituted for an equal weight of filler in the composition.

From the foregoing, it can be seen that the composition of the present invention will provide a corrosion proof coating adapted for application on porous unglazed masonry surfaces thereby producing a durable, corrosion resistant surface designed to add many years of useful service to both existing surfaces and new construction alike. From examination of the physical properties of this coating as noted hereinbefore, it can be seen that the coating has a minimum shrinkage upon setting which reduces the possibility of cracking and the development of internal stresses which could adversely affect its other physical properties. More important, however, is the property of the coating which causes it to form an extremely strong bond with porous unglazed masonry surfaces.

Having described the invention, what is claimed as new is:

A coating composition comprising about 4.45 to 7.0 parts by weight of diglycidyl ether of bisphenol A diluted with about 20% by weight of butyl glycidyl ether having a viscosity of about 150 to 210 centipoises at 25° C. and an epoxide equivalent of about 170 to 180, about 3.75 to 5.07 parts by weight of diglycidyl ether of bisphenol A having a viscosity of about 10,000 to 16,000 centipoises at 25° C. and an epoxide equivalent of about 180 to 200, about 1.25 to 3.06 parts by weight of an epoxy flexibilizer, about 1.24 to 1.47 parts by weight of an epoxy accelerator and about 51.76 to 87.06 parts by weight of a graded aggregate silica sand having a screen analysis of about 17% by weight 6 to 10 mesh or coarser; about 31% by weight 10–20 mesh; about 25% by weight 20–40 mesh; about 14% by weight 40–60 mesh; about 6% by weight 60–80 mesh; about 3% by weight 80 to 100 mesh and about 4% finer than 100 mesh.

References Cited in the file of this patent
UNITED STATES PATENTS 2,861,011     Asbeck et al. _____ Nov. 18, 1958
2,943,953     Daniel _____ July 5, 1960

OTHER REFERENCES

Jorczak et al.: "Rubber World," April 1954, pp. 66–69.